United States Patent [19]
Fritsch

[11] 3,890,074
[45] June 17, 1975

[54] EXTRUSION AND COOLING PLANT FOR PLASTICS STRANDS

[76] Inventor: Rudolf Paul Fritsch, Goslarer Strasse 58, 7 Stuttgart 58, Germany

[22] Filed: Apr. 17, 1973

[21] Appl. No.: 351,866

[30] Foreign Application Priority Data
Apr. 22, 1972  Germany............................ 2219786
July 10, 1972  Germany............................ 2233917

[52] U.S. Cl. .................. 425/71; 425/377; 425/455
[51] Int. Cl. ........................................... B29c 25/00
[58] Field of Search .... 425/70, 71, 377, 455, 378.5, 425/464; 264/178, 209, 95

[56] References Cited
UNITED STATES PATENTS

| | | |
|---|---|---|
| 2,834,053 | 5/1958 | Bilanin et al................ 264/178 R X |
| 3,021,560 | 2/1962 | Hamilton et al.................. 425/71 X |
| 3,217,359 | 11/1965 | Euling............................ 264/209 X |
| 3,609,805 | 10/1971 | Fritsch.................................. 425/71 |
| 3,814,779 | 6/1974 | Wiley.............................. 425/208 X |

FOREIGN PATENTS OR APPLICATIONS
652,307  8/1964  Belgium.............................. 425/464

*Primary Examiner*—R. Spencer Annear
*Attorney, Agent, or Firm*—Shenier & O'Connor

[57] ABSTRACT

Plastics strands are simultaneously extruded through apertures in the underside of a die head. A pair of conveyor belts arranged face to face and forming an inlet funnel below the die head draw the strands into a coolant bath. The die head apertures are arranged in two or more rows, the apertures of adjacent rows being offset. The facing surfaces of the conveyor belts may be provided with longitudinal ribs.

9 Claims, 5 Drawing Figures

EXTRUSION AND COOLING PLANT FOR PLASTICS STRANDS

The invention relates to an extrusion and cooling plant for producing plastic strands, for instance in the production of plastic granulate, in which a plurality of plastic strands are to be simultaneously extruded through a die head with apertures on the underside and two conveyor belts form an inlet funnel below the die head to guide the plastic strands into a coolant bath.

In known systems of this kind the die head is provided with a row of apertures, which are spaced apart from each other so as to reliably avoid the risk of the freshly extruded (and therefore still soft and sticky) plastic strands touching each other, which would result in their adhering to each other and becoming rejects. On the other hand, efforts are made in the interests of the economic efficiency of such a plant to simultaneously extrude as many plastic strands as possible, but in view of the problem just mentioned, it has not been possible to increase the number of such strands beyond a definite limit for a given plant width.

Attempts have therefore also been made to extrude a plastic web from a broad-slit die and to cut such a web longitudinally and transversely after cooling and hardening, but many plastic materials are more or less damaged by the cutting operation in the region of the cut surfaces, so that efforts are made to minimise the area of the cut surfaces as much as possible. The strand granulating process, in which the plastic particles have only two cut surfaces, is preferred because particles with four cut surfaces are obtained in granulating a plastic web.

It is therefore an object of the invention to improve a plant for performing the strand production process so that the number of simultaneously produced plastic strands could be increased for a given plant width, in comparison with known plants. Accordingly, the present invention is based on the use of a die head provided with at least two rows of apertures which are disposed in an alternate offset arrangement.

The present invention provides an extrusion and cooling plant for producing plastic strands, comprising a die head having at least two rows of apertures on its underside, from which a plurality of plastic strands are to be simultaneously extruded, the apertures of each row being offset with respect to those of each adjacent row; a pair of conveyor belts arranged face to face over part of their length and forming an inlet funnel for the plastic strands below the die head; and a coolant bath into which the conveyor belts extend.

Since the diameter of the freshly extruded plastic strands diminishes in the zone between the die head and the inlet funnel formed by the conveyor belts, because of the pull due to the conveyor belts and gravitational force, the offset arrangement of the die head apertures (in a zig-zag line if there are only two rows) permits the number of apertures of a specific diameter provided in a die head of given width to be greater than in an aperture configuration in a single row, without an increase in the risk of the still soft and sticky plastic strands touching each other on the path between the die head and the conveyor belts.

The freshly extruded plastic strands (and therefore the die head apertures) may be brought even more closely together if the facing surfaces of the conveyor belts (between which the plastic strands are taken up) are provided with longitudinal ribs which are so constructed that the longitudinal ribs of one conveyor belt are opposite the grooves between the longitudinal ribs of the other conveyor belt, the two conveyor belts thus forming practically separate longitudinal ducts for accommodating a separate plastic strand. In this way, it is possible for the plant width to be fully utilised so that the rate of utilisation corresponds to that obtained with the extrusion of a plastic web, because the ribbing of the conveyor belts enables the individual plastic strands to be directly adjacently disposed in the transverse direction of the said conveyor belts. At the same time, it is possible to avoid the disadvantages which necessarily result from granulating a plastic web.

It is known to provide each plastic strand with a separate duct for the cooling process in an extrusion and cooling plant for plastic strands (East German Pat. Specification 60 638) but in such a plant the ducts are formed by tubes, which give rise to problems when a strand extrusion and cooling plant is started: The beginning of each freshly extruded plastic strand is of droplet shape so that these droplets either block the tubes or the tubes must be provided with an internal diameter which is unnecessarily large for continuous operation and leads to a much less efficient utilisation of the plant width than is the case in the construction according to the present invention. In the present construction it is possible for the apertures of the die head to be disposed so close to each other that the individual plastic strands stick to each other (due to their tickened starting portions) when the plant is started, since the conveyor belts, which are flexible and resilient (e.g. of synthetic rubber), are also capable of accommodating between them a band of plastic strands which are adhesively joined to each other and are able to convey such a band through the cooling plant – and immediately after starting of the extruding and cooling plant, plastic strands which are separated from each other will enter separately into the ducts which are formed by the conveyor belts.

It is evident that the apertures of the die head need not be circular but that these apertures may have any desired cross-section. Furthermore, in the course of cooling, the ribbed conveyor belts may be adjoined by conveyor belt pairs with a smooth surface. It may also be mentioned that the two rows of apertures of the die head, when only two are present, are appropriately disposed on both sides of a vertical plane which forms the median plane of the inlet funnel; it is however also feasible for one of the two rows to be disposed in the plane, i.e. directly over the middle of the inlet funnel.

The ribbed conveyor belts may be inexpensively produced, since it is not necessary to use different moulds for the production of the intermeshing conveyor belts if the conveyor belts are fitted in an offset configuration on the reversing pulleys of the cooling plant.

The conveyor belts are preferably of such a length that the freshly extruded plastic strands are guided separately from each other until their surface is sufficiently cooled and they are no longer sticky. Thereafter and while bearing directly against each other, they may be guided in one plane between smooth conveyor belts or in some other manner until they are almost completely solidified.

It is appropriate if one surface of each conveyor belt has a rectangular rib section, because this results in optimum utilisation of the plant. It is also advantageous to guide the two conveyor belts parallel to each other so that the longitudinal ribs of one conveyor belt engage in the grooves of the other by a definite fraction of their height, in order to achieve complete separation of the ducts which accommodate the plastic strands, although it would theoretically be sufficient if the end-faces of the longitudinal ribs of both conveyor belts were to extend in one common plane.

To prevent the freshly extruded plastic strands bearing with their full surface against the surface of the conveyor belts, it is recommended to roughen the end-faces of the ribs and the base surface areas of the grooves and more particularly to provide them with a waffle pattern to ensure that substantial quantities of coolant are disposed between the surfaces of the plastic strands and those of the conveyor belts.

To prevent the cooling medium interfering with the closing of the ducts for accommodating the freshly extruded plastic strands when the conveyor belts run together in the zone of the inlet funnel, it is also advantageous if coolant discharge apertures, extending through the conveyor belt, are provided in the grooves.

At the desired high haul-off speeds for the plastic strands, i.e. at high operating speeds of the conveyor belts, the belts will entrain substantial quantities of coolant on emerging from the coolant bath, and these quantities of coolant would fill the inlet funnel, which might be detrimental when processing plastics whose freshly extruded plastic strands have a low degree of stiffness and a low specific gravity. In order to obtain a defined coolant film on the surface of each conveyor belt, in a plant in which the conveyor belts for forming the inlet funnel are guided over two reversing pulleys below the die head, the ribbed surfaces of the conveyor belts are guided over coolant stripping rollers upstream of the reversing pulleys and preferably having a surface section with ribs corresponding to the ribs and grooves of the conveyor belts but being constructed to a height which is less by a definite amount than that of the ribs of the conveyor belts. A coolant film of defined thickness will then be entrained in the grooves of the conveyor belts.

The invention will be described further, by way of example only, with reference to the accompanying drawings, in which.

Figure 1:
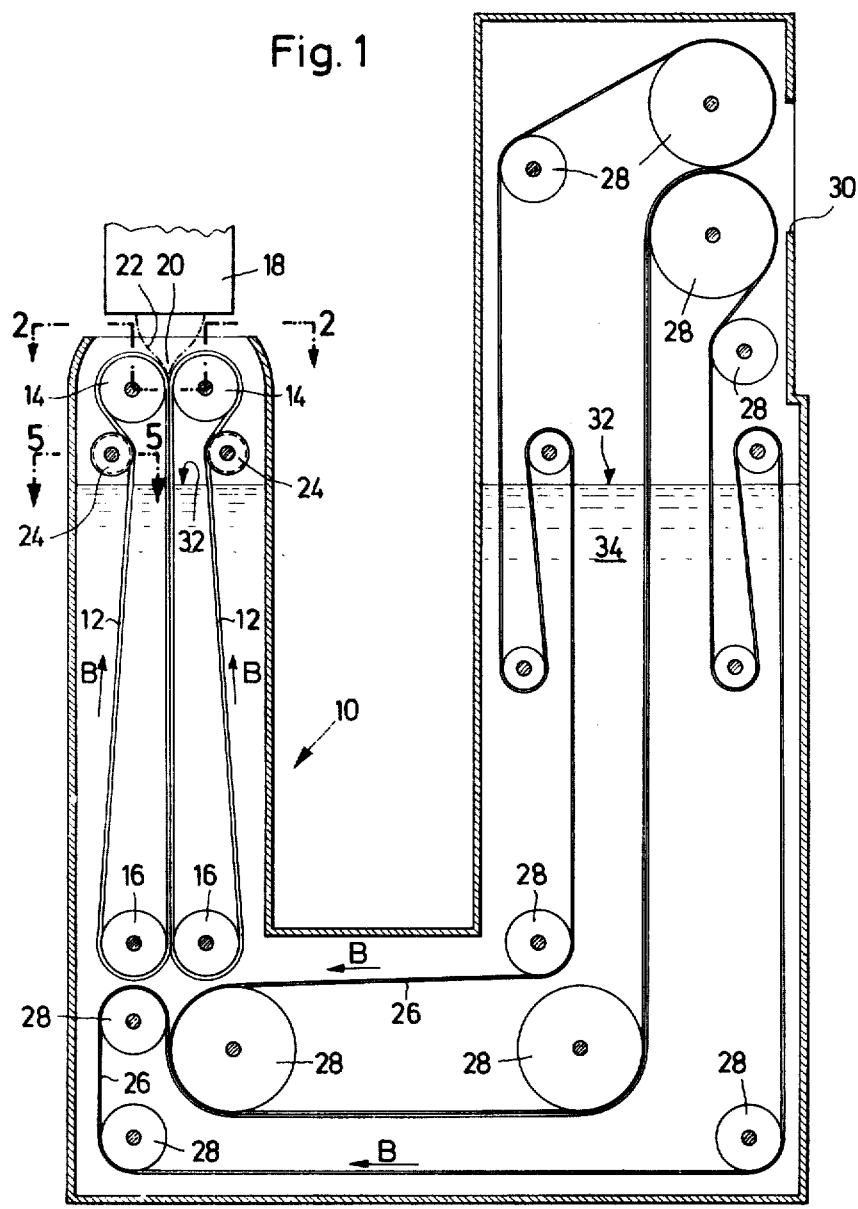
FIG. 1 is a diagrammatic vertical section through an extrusion die head and cooling plant for producing plastic strands.

A coolant tank 10 accommodates a first pair of endless conveyor belts 12 guided by upper and lower reversing pulleys 14 and 16, respectively, and forming an inlet funnel 20 below a die head 18 for the extrusion of two rows of plastic strands 22. The shafts of the reversing pulleys 14 and 16 (and those of the reversing pulleys described below) are rotatably journalled on the side walls of the coolant tank 10 and at least one of the reversing pulleys of each pair of conveyor belts is driven; however, it is advantageous to drive one reversing pulley of each conveyor belt in synchronism with that of the other belt. The conveyor belts 12 also run over stripper rollers 24 which will be described in detail below.

The plastic strands 22 which are accommodated between the conveyor belts 12 subsequently pass between two further endless coveyor belts 26, which may have a smooth surface and which run over a series of reversing pulleys 28; at least one of the reversing pulleys 28 is driven in such a way that the speed of the conveyor belts 26 may be slightly higher than that of the conveyor belts 12. The coolant tank 10 has a delivery aperture at 30 from which the cooled plastic strands emerge - they are then supplied to a so-called granulator which processes the strands into granulate. The coolant tank 10 is filled with water 34, constituting the coolant, to a given water level 32.

Figure 2:
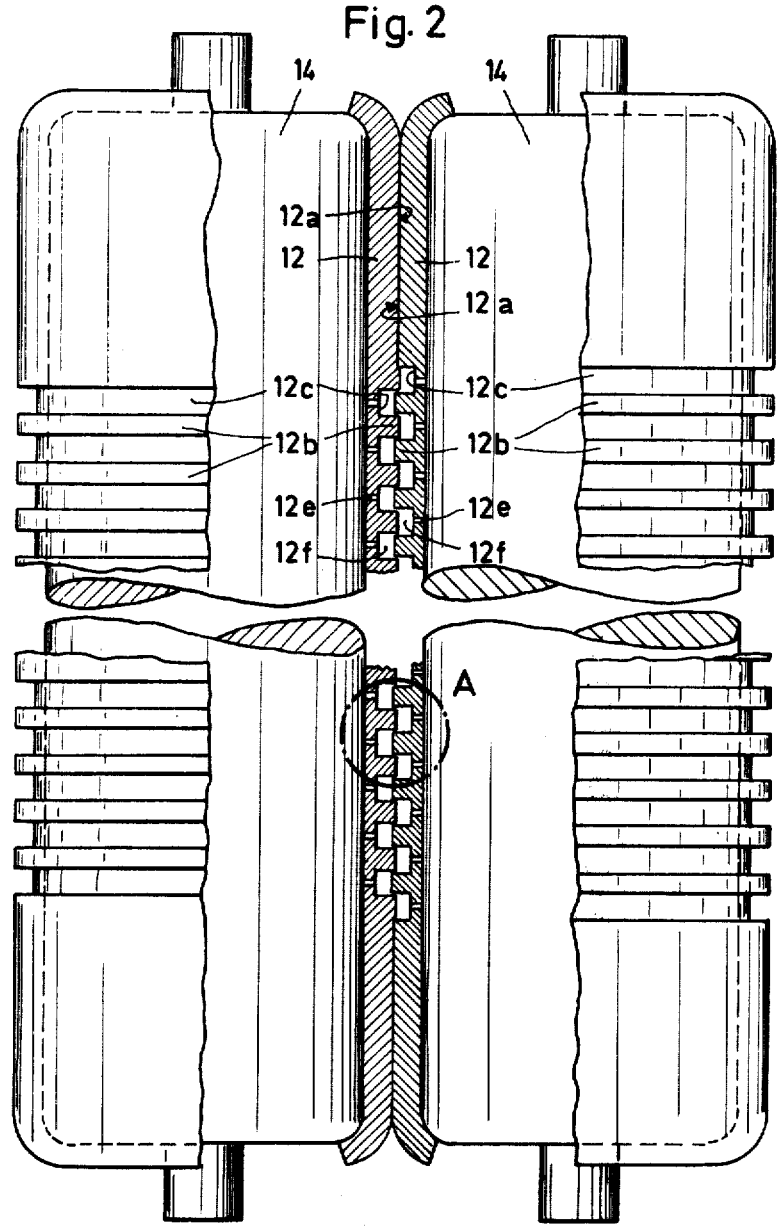
FIG. 2 is a section along line 2—2 of FIG. 1.
Figure 3:
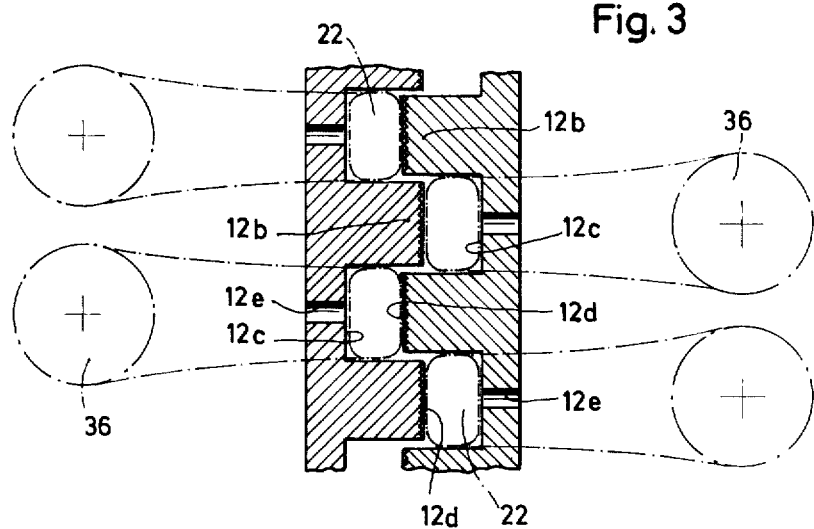
FIG. 3 shows the region marked A in FIG. 2 to a scale larger than that of FIG. 2 and also shows (in chain line) a part view of the die head of FIG. 1.
Figure 4:
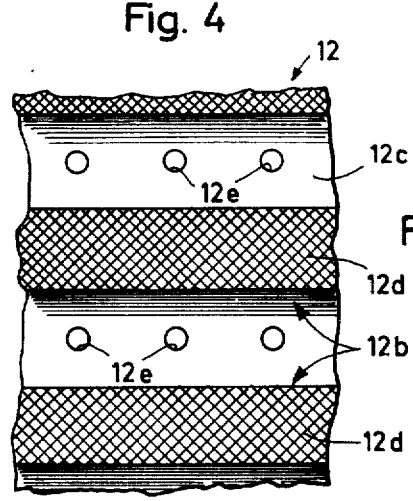
FIG. 4 is a plan view of a section of one conveyor belt.
Figure 5:
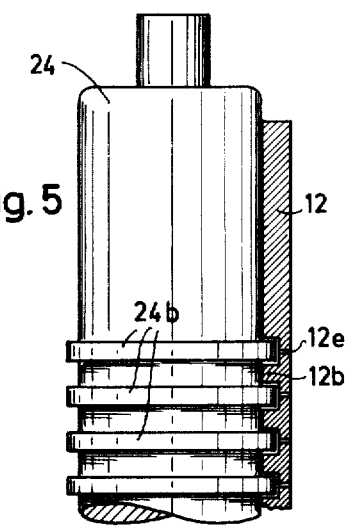
FIG. 5 is a fragmentary section along line 5—5 of FIG. 1.

FIGS. 2 and 3 illustrate the construction of the conveyor belts 12 and the arrangement of the die apertures 36 (FIG. 3) in the die head 18. The conveyor belts 12 are made of synthetic rubber. Each has a sectioned, outwardly facing surface 12a, and it should be noted that the two conveyor belts are identical in construction. The sectioned surfaces of the belts are provided with ribs 12b and grooves 12c, the ribs projecting slightly beyond the unsectioned zones of the surface 12a so as to engage in the grooves 12c of the opposite conveyor belt if the conveyor belts 12 are correctly postioned and are correctly orientated relative to each other, as is shown particularly clearly in FIG. 3. FIGS. 3 and 4 also illustrate the end-faces of the ribs and the base surface areas of the grooves, which are both provided with a waffle pattern 12d. The conveyor belts 12 also have discharge apertures 12e so that cooling water may be at least partially discharged from the ducts 12f formed between them, as the plastic strands 22 enter these ducts.

As may be seen particularly clearly by reference to FIG. 3, the die apertures 36 of the two rows of apertures are disposed in an alternating offset arrangement and they are so arranged that each plastic strand, which emerges from the die head under the effect of gravity, meets one of the conveyor belts 12 at a position at which the conveyor belt has a groove 12c. It can also be seen from FIG. 3 that the plastic strands 22 adjoin directly upon each other in the transverse direction of the conveyor belts 12, so that the entire width of the sectioned part of the belts can be utilised.

Owing to their velocity the conveyor belts 12, which circulate in the direction of the arrows B in FIG. 1, entrain substantial quantities of cooling water when emerging from the water level 32, but this cooling water must be removed by the stripper rollers 24 with the exception of a definite water film. To this end, the stripper rollers 24 have a section with rotating ribs 24b adapted to the section of the conveyor belts 12 but having a height which is slightly less than the depth of the grooves 12c and (if appropriate) also being narrower by a given amount.

An embodiment in which the longitudinal ribs, and therefore also the grooves, of the two first conveyor belts are not continuous but have interruptions is also practicable. The longitudinal ribs may, in the limiting case, be replaced by projections or protuberances functioning as spacers for the plastic strands. The consequence of such measures is of course that the ducts are no longer enclosed. On the other hand, the cooling rate of the plastic strands is increased.

It is also feasible to provide more than two rows of apertures on the die head, the apertures of each row being disposed opposite to the gaps of the adjacent row so that all extruded plastic strands are disposed adjacently between the conveyor belts. In this way, it is possible to prevent insufficient material existing between the apertures of the die head.

I claim:

1. Apparatus for extruding and cooling plastic strands comprising a tank for liquid coolant, a die head provided with at least two rows of downwardly facing apertures from which a plurality of plastic strands are to be simultaneously extruded, the apertures of each row being offset with respect to the apertures of an adjacent row, and a pair of endless conveyor belts arranged in abutting face-to-face relationship over at least a portion of their respective lengths to define an inlet funnel below said die head for receiving strands extruded therefrom and for transporting them into a coolant in said tank, the facing surfaces of said conveyor belts being provided with longitudinally extending ribs, the ribs of one of the pair of belts being laterally offset with respect to the ribs of the other said pair of belts, each rib of one belt defining with the space between a pair of ribs of the other belt a duct extending longitudinally of said pair of belts for transporting a single extruded plastic strand.

2. The invention as defined by claim 1, wherein the outermost extremities of the ribs on one of said pair of conveyor belts project at least partially into the respective spaces defined by the sidewalls of adjacent ribs on the other of said pair of conveyor belts.

3. The invention defined in claim 1, wherein each of said pair of conveyor belts is provided with a plurality of apertures extending therethrough and disposed in the spaces between said ribs for circulating coolant while immersed therein.

4. The invention defined in claim 1, wherein said pair of conveyor belts comprise synthetic rubber material.

5. The invention defined in claim 1, wherein said two rows of apertures provided in the die head are disposed on respective opposite sides of a plane defined by the abutting faces of the conveyor belts defining said inlet funnel.

6. The invention defined in claim 1, wherein the cross-section of the ribs provided on at least one of said pair of belts is rectangular.

7. The invention defined in claim 6, wherein the surfaces of the extremities of said rectangular ribs and the surfaces of the conveyor belts between the bases of said ribs are roughened.

8. The invention defined in claim 1, wherein said pair of endless conveyor belts include two reversing rollers supporting the respective belts below said die head, and also include two coolant stripping rollers disposed for guiding the respective belts upstream from the reversing pulleys.

9. The invention defined in claim 8, wherein the axial cross-sections of the peripheral surfaces of said coolant stripping rollers is substantially complementary to the exposed sufaces of the respective conveyor belts, the height of the ribs on said rollers being less than the depth of the spaces defined by adjacent ribs on said belts.

* * * * *